Patented June 20, 1939

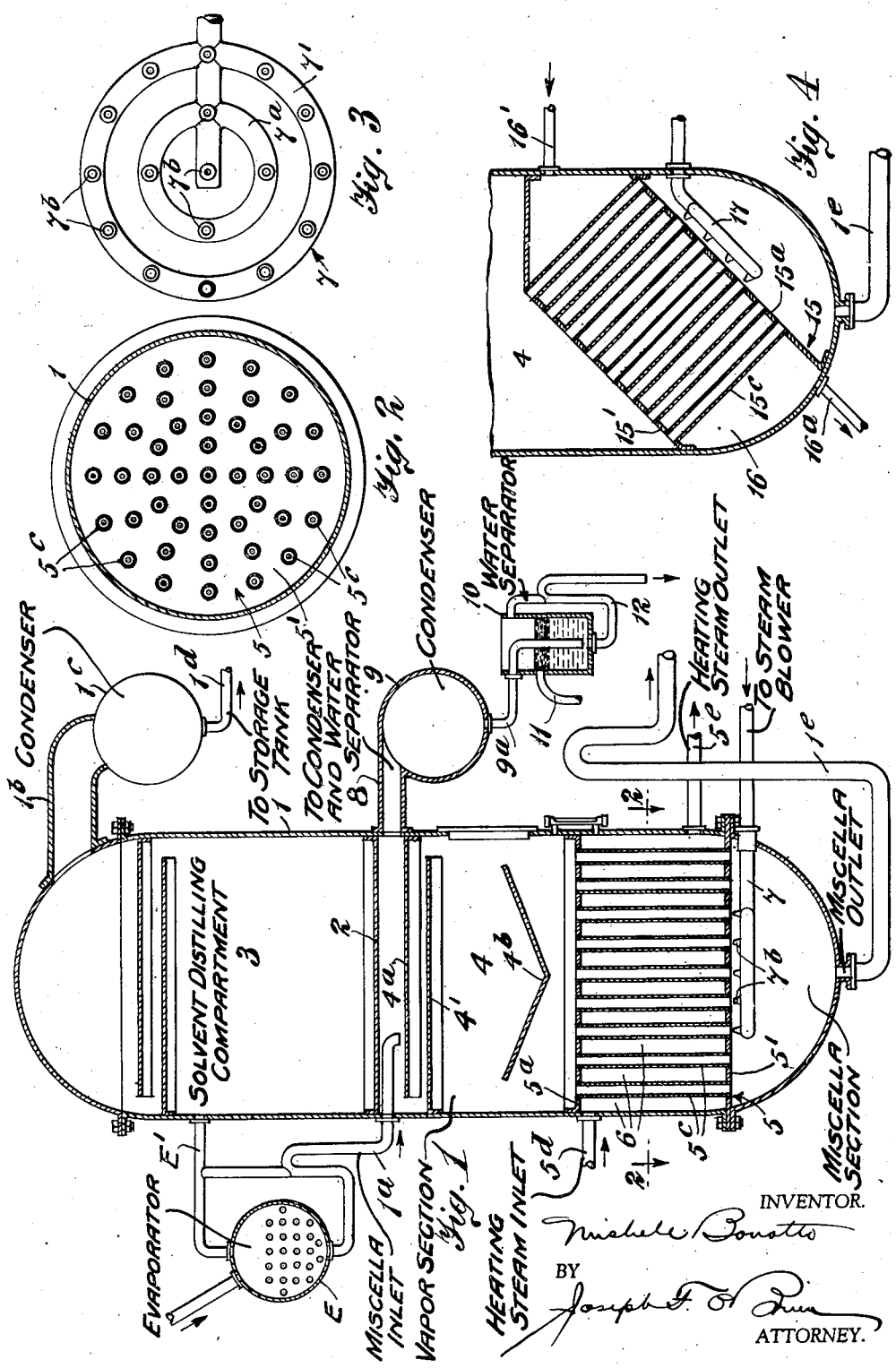

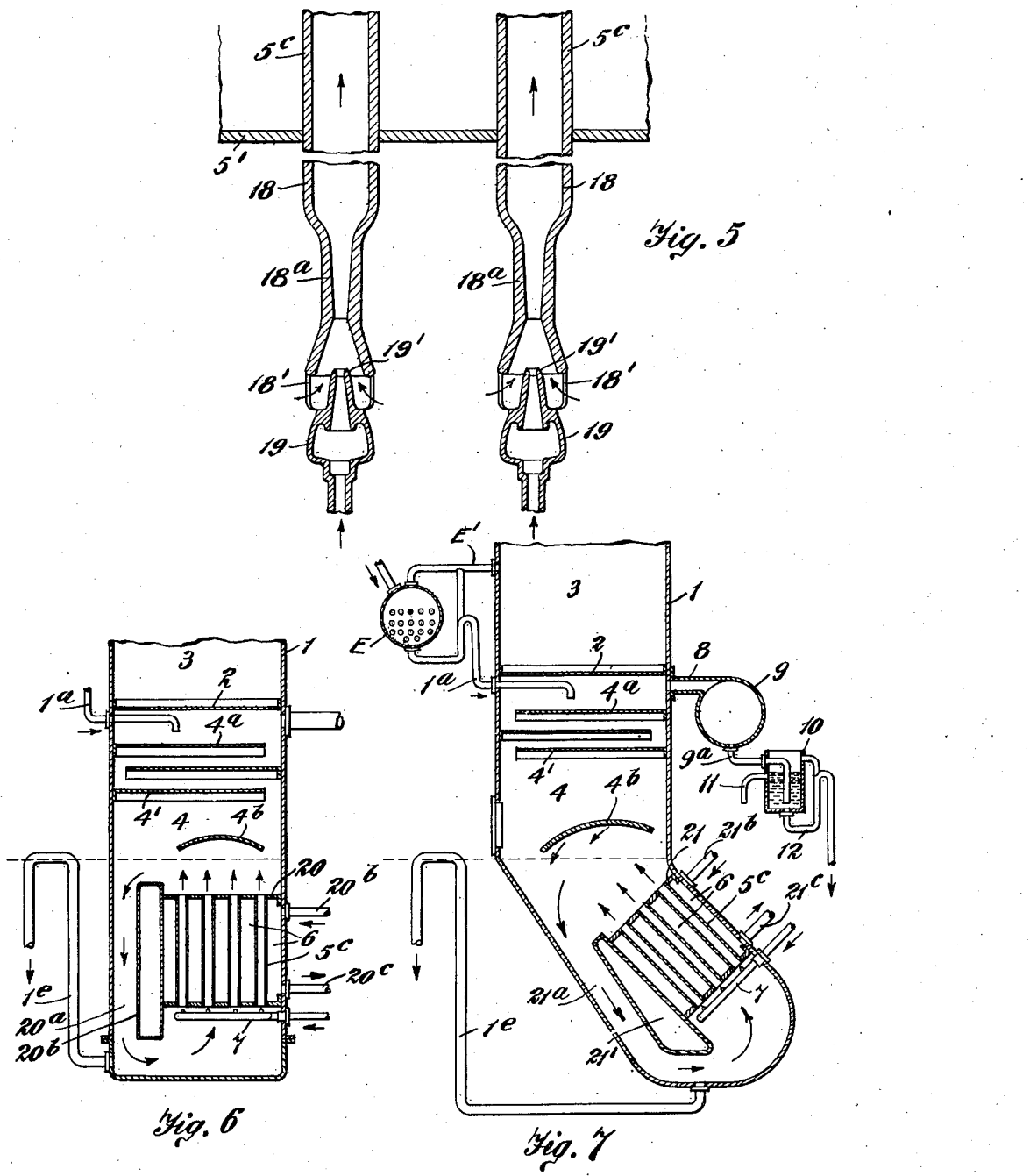

2,163,303

UNITED STATES PATENT OFFICE 2,163,303

PROCESS FOR SEPARATING SOLVENT FROM OIL IN MISCELLA AND LIKE MIXTURES

Michele Bonotto, Evansville, Ind., assignor to Extractol Process, Ltd., Wilmington, Del., a corporation of Delaware Application August 9, 1935, Serial No. 35,443

2 Claims. (Cl. 202—46)

This invention relates to improvements in processes and apparatus for separating solvent from oil in miscella and like mixtures.

In conventional apparatus of the type specified, heating elements for the miscella have been employed and jets of steam have, independently of the heating element, been blown through the miscella for the purpose of entraining with the steam and carrying off from the mixture the last particles of solvent in vapor form, this steam-blowing being employed after the greater part of the solvent was initially eliminated by indirect heat. The solvent and steam produced in such steam-blowing operation are thereafter readily condensed and the water separated from the solvent, but in such apparatus the application of a degree of heat to the miscella which would be effective in assisting separation and in avoiding condensation of the live steam in the mass of the liquid causes charring of the oil and when a heating element has been employed in contact with the miscella, a solid film forms on the metal surface. This solid film has heat insulating properties and retards effective heat transfer, so that frequent cleaning is necessary.

One of the objects of this invention is in an apparatus of the type under consideration, to overcome the difficulties experienced with prior art apparatus and to procure efficient and more rapid separation of the solvent from the oil without charring or discoloration of the oil.

Another object of this invention is, in an apparatus of the type specified, to arrange a heating element and a steam-blowing element in such a way as to cooperate with each other and greatly improve the efficiency of the apparatus for separating the solvent from the oil in the miscella.

Another object of my invention is to utilize jets of blown steam to produce a thorough circulation of the said miscella through a heating element during the treatment of the miscella and thus to avoid the formation of solid films and charring or burning of the oil.

Still another object of my invention is to utilize mechanism for blowing jets of steam in such cooperation with a heating element as to cause the rapid movement of the miscella against heated metal walls and thus to permit heating of such walls to a degree of heat which would heretofore be impossible to use without charring and discoloring the oil and to provide such contact of the miscella with heated metal that will pulverize the oil and enable rapid separation of the solvent vapors from the oil particles and at the same time will avoid charring of the oil and/or the formation on the metallic heat-transfer surface of films which reduce heat-transferring efficiency and necessitate frequent cleaning.

Another object of my invention is to enable uniformity of heat-transfer and uniformity of heating of the miscella.

Another object of my invention is to confine jets of steam within tubular members which are preferably independently heated, and to blow the particles of oil and solvent into intimate contact with heated surfaces having such a degree of heat as to pulverize the oil and to more readily vaporize the solvent without burning, charring or otherwise deleteriously affecting the particles of oil from which the solvent is being separated.

Still another object of my invention is to utilize a heating element which will effectively divide the miscella treating zone into a plurality of zone sections and to provide jets of steam to produce a forced circulation of the miscella through said zone sections.

Another object of my invention is to employ a heating chest embodying a series of tubes and to utilize steam jets to blow miscella through some of such tubes and to utilize other tubes or other conduits, which may or may not be heated as return channels for the miscella, thus providing a circulation of the miscella through the tubular heating element.

With these and other objects in view the invention comprises the combination of parts so arranged as to coact and cooperate with each other in the performance of the functions and the accomplishment of the results herein contemplated and comprises in one of its adaptations the species or preferred form illustrated, in which:

Fig. 1 is a vertical section of an apparatus embodying my invention;

Fig. 2 is a section on the line 2—2 of Fig. 1;

Fig. 3 is a view in plan of the steam-jet blowing-apparatus employed by me;

Fig. 4 is a fragmentary view of a modified form of heating and blowing apparatus embodying my invention.

Fig. 5 is a fragmentary section of a modified form of my invention showing the bottom of a heating element having a tubular extension in substantially the form of a Venturi tube with special steam nozzles fitted thereto;

Fig. 6 is a vertical section of a modified form of a vertical tank with a return conduit separate from the heating element; and Fig. 7 is still another modified form showing a separate return conduit applied to a tank having an inclined heating element.

Referring now to these drawings and particularly to Figs. 1 to 3 thereof, 1 indicates a conventional cylindrical tank divided by a conventional partition 2, into an upper conventional solvent-distilling compartment 3 and a lower miscella-treating compartment 4.

In accordance with my invention, the lower miscella-treating compartment 4 is provided with a heating element 5 suitably mounted within the zone for treating the liquid miscella at the lower part of compartment 4 which has a miscella inlet pipe 1ª and an outlet pipe 1ᵉ for the oil freed from solvent.

The heating element 5 preferably comprises a lower circular head 5' and an upper circular head 5ª connected by a series of open-ended tubes 5ᶜ secured at their opposite ends to said heads so as to enable the space 6 surrounding said tubes to provide a steam-heated chamber supplied with steam through the steam inlet pipe 5ᵈ and having a steam outlet pipe 5ᵉ, the said tubes, being supported within the miscella, contain liquid miscella supplied through said inlet pipe 1ª. The level of the liquid miscella is preferably maintained substantially flush with the upper surface of the upper head 5ª, and the upper part of the charge of miscella being treated is thus divided into a series of confined tubular chambers. The oil freed from solvent is adapted to pass out through the pipe 1ᵉ connected to the bottom of the compartment 4. As shown, the miscella is admitted through the inlet pipe 1ª after having passed through a suitable evaporator E within which 95% of the solvent is initially evaporated from the miscella in the conventional manner. The upper part of the evaporator E is connected by pipe E' with the upper compartment 3 to admit thereto evaporated solvent which passes through pipe 1ᵇ into the condenser 1ᶜ and thence by pipe 1ᵈ to a suitable storage tank.

In accordance with my invention, I provide improved means for removing the solvent which still remains in the miscella after such conventional treatment in the evaporator, and to this end, I provide means for forcibly causing contact between the miscella and the metallic inner walls of said tubes, and for this purpose I provide a steam-blowing element 7 preferably comprising a plurality of concentric rings 7', 7ª, having jet orifices 7ᵇ, preferably of reduced size or diameter adjacent to the steam inlet conduit and of increasing size or diameter in proportion to the remoteness thereof from such inlet conduit. These jet orifices are positioned to register with a section of the tubes of the heating element, one jet orifice being disposed beneath each of the tubes in the section of blow tubes. Each steam jet will thus be substantially confined within a tube of the heating element.

A rapid circulation may be obtained by blowing miscella upwardly through some of the tubes and causing movement thereof downwardly in other tubes, and in the preferred form of my invention, I have shown in Fig. 1, a steam blowing element 7 is positioned at the center of the heating element 5 and its jet members 7ᵇ are arranged to register with a centrally-disposed section of tubes 5ᶜ at the central part of the heating element while a concentric band of tubes are free of jets and provide return channels for the circulating miscella.

When steam is admitted into this blower element 7 and the lower part of the chamber 4 is filled with miscella to the level stated, the blowing element will, by blowing steam through the tubes, force the miscella into contact with the hot metallic walls of the tubes to pulverize the same and at the same time will produce rapid circulation as aforesaid upwardly through the central tubes and downwardly through the outer concentric band of tubes and this circulation will prevent such long contact with the hot metallic tube walls as will cause a burning or charring of the oil, it being understood that the heat within the heating element may be regulated to the desired temperature and the time period of contact of the miscella with such hot walls may be made as brief as desirable. Such circulation will furthermore, prevent the formation of a film on the heating element, thus avoiding the heat insulating effect of such films and will enable more efficient heat transfer from such heating element to the miscella which is being treated.

In the embodiment shown, the vapors of the solvent entrained by the steam will, after passing through the baffles 4', 4ª pass out through the pipe 8 into the condenser 9 and thence through the pipe 9ª into the water separator 10 in which the solvent, assuming that it is gasoline and lighter than water, will pass out through the pipe 11 to a suitable storage tank and water will pass out through the gooseneck pipe 12, a pipe 13 extending from the upper end of the gooseneck to atmospheric pressure at the upper end of the tank to prevent any siphoning action by the pipe 12.

In Fig. 4 I have shown a heating-element 15 comprising heater-heads 15', 15ª arranged in inclined position and supporting heater tubes 15ᶜ. In this construction, steam is admitted into the chambers 16 by the inlet pipes 16' and is permitted to pass out therefrom through the outlet pipe 16ª. A jet blowing element 17 preferably of steam is arranged in inclined position beneath the tubular heating element and blow jets of steam through a series of centrally-arranged tubes while the outer band of tubes is used for return channels. In this construction, the operation is substantially similar to that shown and described in regard to Fig. 1 except that slightly more resistance to the circulation of the liquid would be encountered and except that the hot metal extends diagonally across the normal vertical path of the liquid. Such circulation in a vertical path is due to the specific gravity of the liquid being acted upon by the steam jets. In other respects this construction is similar to that described in regard to Fig. 1.

In Fig. 5, I have shown a modified form of my invention in which those tubes 5ᶜ within or through which steam jets are blown are provided with downward extensions 18 extending below the bottom head or plate 5'. These extensions are substantially in the form of Venturi tubes having side inlets 18' and contracted middle portions 18ª. Jet nozzles 19 of special form having noses 19' extending within the lower ends of the tubes are provided and may be supplied with steam from a ring conduit similar to that hereinabove described or other suitable conduits.

In other respects the device illustrated in Fig. 5 is similar to that shown in Fig. 1.

In Fig. 6, I have shown a vertical tank construction in which only heated tubes through which steam is blown are grouped or bunched together in a heating element 20, a separate elongated heating chest or heat is provided at one side thereof and a return channel or conduit 20ª is provided between said elongated chest and the wall of the tank. In this case, steam for heating the tubes is admitted through the inlet pipe 20b and condensed steam is passed through the outlet pipe 20c.

In Fig. 7, I have shown the same grouping principle of Fig. 6 applied to an inclined heating element 21 having an elongated head 21', a separate return conduit 21a and an inlet 21b and outlet 21c.

In other respects the construction shown in Figs. 6 and 7 are similar to those hereinabove described as to Figs. 1 and 4 respectively.

Having described my invention, I claim:

1. The process of separating solvent from oil in miscella consisting in providing within a treating tank a body of miscella, immersing within said miscella a bank of tubes surrounded by steam chambers to heat the same, blowing within the body of miscella jets of steam with entrained miscella through and into contact with said tubes to procure a rapid circulation of the miscella through such heating element and to avoid condensation of the blown steam within the mass of miscella, and also simultaneously and in the same operation utilizing said jets of steam to pulverize the miscella and entrain and drive off the last traces of solvent from the miscella, treating said pulverized miscella and steam to condense the same and separating the water and solvent.

2. The process of treating miscella consisting in providing within a treating tank a body of miscella, immersing within said miscella a bank of tubes surrounded by steam chambers, blowing within the body of miscella jets of steam with entrained miscella through and into contact with said tubes to procure a rapid circulation of the miscella through such heating element and to avoid condensation of the blown steam within the mass of miscella, and providing in said bank of tubes a degree of heat which will, upon such contact by blowing of steam jets, pulverize the oil to more readily vaporize the solvent content thereof and to entrain and drive off the last traces of solvent from such pulverized oil.

MICHELE BONOTTO.